(12) United States Patent
Folk et al.

(10) Patent No.: US 9,311,671 B2
(45) Date of Patent: Apr. 12, 2016

(54) SYSTEM AND METHOD OF PROVIDING REPLENISHMENT AND PICK-UP SERVICES TO ONE OR MORE CASH HANDLING DEVICES

(75) Inventors: Amy Baker Folk, Charlotte, NC (US); Daniel Christopher Bohen, Charlotte, NC (US); Veralyn Hensley, Folsom, CA (US); James Heddleson, Charlotte, NC (US); Michelle Nichols, Rock Hill, SC (US); Todd Atwood, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 807 days.

(21) Appl. No.: 12/277,847

(22) Filed: Nov. 25, 2008

(65) Prior Publication Data

US 2010/0131407 A1 May 27, 2010

(51) Int. Cl.
*G06Q 10/00* (2012.01)
*G06Q 40/00* (2012.01)
*G06Q 20/10* (2012.01)

(52) U.S. Cl.
CPC ............... *G06Q 40/00* (2013.01); *G06Q 20/10* (2013.01)

(58) Field of Classification Search
USPC ............... 705/35–38, 16, 21, 28, 69, 26, 29; 235/379, 383
See application file for complete search history.

(56) References Cited

U.S. PATENT DOCUMENTS

| | | | |
|---|---|---|---|
| 5,340,967 A * | 8/1994 | Martin et al. ................ 235/379 |
| 5,606,157 A | 2/1997 | Awatsu et al. | |
| 5,900,607 A | 5/1999 | Awatsu et al. | |
| 6,014,649 A | 1/2000 | Kobayashi et al. | |
| 6,021,397 A * | 2/2000 | Jones et al. ................ 705/36 R |
| 6,109,522 A * | 8/2000 | Force et al. ................ 235/379 |
| 6,607,124 B1 * | 8/2003 | Junkins et al. ................ 235/379 |
| 7,219,083 B2 * | 5/2007 | Bellucci et al. ................ 705/43 |
| 7,513,419 B1 * | 4/2009 | Crews et al. ................ 235/379 |
| 7,669,757 B1 * | 3/2010 | Crews et al. ................ 235/379 |
| 7,900,829 B1 * | 3/2011 | Folk et al. ................ 235/380 |
| 8,430,303 B1 * | 4/2013 | Sanders et al. ................ 235/379 |
| 8,600,842 B1 * | 12/2013 | Sanders et al. ................ 705/28 |
| 2001/0042785 A1 * | 11/2001 | Walker et al. ................ 235/379 |
| 2002/0082994 A1 | 6/2002 | Herziger | |
| 2002/0120572 A1 * | 8/2002 | Bellucci et al. ................ 705/43 |
| 2003/0004870 A1 * | 1/2003 | Van Rensburg et al. ........ 705/39 |
| 2004/0117302 A1 * | 6/2004 | Weichert et al. ................ 705/40 |
| 2004/0215566 A1 * | 10/2004 | Meurer ................ 705/43 |
| 2004/0217162 A1 * | 11/2004 | Chigira et al. ................ 235/379 |
| 2005/0108164 A1 * | 5/2005 | Salafia et al. ................ 705/42 |
| 2006/0212372 A1 | 9/2006 | Eberhardt | |
| 2007/0100750 A1 * | 5/2007 | Hartfield et al. ................ 705/43 |

(Continued)

OTHER PUBLICATIONS

PCT/US09/65281, International Search Report and Written Opinion, mailed Jan. 12, 2010.

*Primary Examiner* — Lalita M Hamilton
(74) *Attorney, Agent, or Firm* — Banner & Witcoff, Ltd.; Michael A. Springs

(57) ABSTRACT

A transport carrier (i.e., an armored vehicle or any mode of transportation) may be equipped with cash storage and recycling capabilities. The transport carrier may be equipped to replenish funds as needed and/or pick up a surplus of funds. The transport carrier may be in communication with a financial institution and/or a central server. In some arrangements, the central server may dynamically route the transport carrier to cash handling devices as various locations in order to efficiently meet the needs of the devices and associated clients.

12 Claims, 16 Drawing Sheets

(56) References Cited

U.S. PATENT DOCUMENTS

| | | | |
|---|---|---|---|
| 2007/0151827 A1* | 7/2007 | Brandstrom et al. | 194/206 |
| 2007/0187485 A1* | 8/2007 | Aas | G07F 19/00 235/379 |
| 2008/0029949 A1 | 2/2008 | Hansson | |
| 2008/0149706 A1 | 6/2008 | Brown et al. | |
| 2009/0032580 A1* | 2/2009 | Blachowicz | G06Q 20/10 235/379 |
| 2009/0140039 A1* | 6/2009 | Force et al. | 235/379 |

* cited by examiner

1400A CARRIER SCHEDULE AND ROUTE

STOP 1: PICK UP SURPLUS $20 AT CLIENT A — 1402A

STOP 2: PICK UP SURPLUS $50 AT CLIENT B — 1402B

STOP 3: DROP OFF $1 AT CLIENT C — 1402C

STOP 4: PICK UP OVERFLOW CARTRIDGE CLIENT D — 1402D

FIG. 14A

1400B CARRIER SCHEDULE AND ROUTE

STOP 1: PICK UP SURPLUS $20 AT CLIENT A — 1402A

STOP 2: PICK UP SURPLUS $50 AT CLIENT B — 1402B

REROUTE STOP 2A: REPLENISH $20 AT CLIENT X — 1404

FIG. 14B

1500A          CARRIER SCHEDULE AND ROUTE

| STOP 1: PICK UP SURPLUS $20 AT CLIENT A | — 1502A |
|---|---|
| STOP 2: PICK UP SURPLUS $50 AT CLIENT B | — 1502B |
| STOP 3: DROP OFF $1 AT CLIENT C | — 1502C |
| STOP 4: PICK UP OVERFLOW CARTRIDGE CLIENT D | — 1502D |

FIG. 15A

1500B          CARRIER SCHEDULE AND ROUTE

| STOP 1: PICK UP SURPLUS $20 AT CLIENT A | — 1502A |
|---|---|
| ~~STOP 2: PICK UP SURPLUS $50 AT CLIENT B~~ | — 1502B |
| REROUTE STOP 2A: REPLENISH $20 AT CLIENT X | — 1504 |
| STOP 2: PICK UP SURPLUS $50 AT CLIENT B | — 1502B |
| STOP 3: DROP OFF $1 AT CLIENT C | — 1502C |
| STOP 4: PICK UP OVERFLOW CARTRIDGE CLIENT D | — 1502D |

FIG. 15B

SYSTEM AND METHOD OF PROVIDING REPLENISHMENT AND PICK-UP SERVICES TO ONE OR MORE CASH HANDLING DEVICES

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

Cash handling devices, such as cash recyclers, are being used in more locations, i.e., retails stores, and the like. However, in conventional systems, all requests for replenishment of funds or pick up of funds at a cash recycler are conducted at a financial institution. For instance, a cash recycler in need of additional funds will place a change order with the financial institution for the desired funds. A transport carrier will then transport the funds from the financial institution to the cash handling device. This arrangement can be inefficient and time consuming. Accordingly, there is a need for an efficient method of replenishing and removing cash from cash handling devices.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention relate to providing cash storage and recycling capabilities on a transport carrier (i.e., armored truck, and the like). In some arrangements, the transport carrier may conduct various transactions at various cash handling devices. The transactions may be communicated to a financial institution and a client account, direct deposit account, financial institution general ledger account, and the like may be debited or credited. Transactions may be completed using funds on board the transport carrier, rather than requiring funds, and the like to be transported from the financial institution to the cash handling device. For instance, a request for a replenishment of $20 bills may be completed using funds on board the transport carrier that may have been picked up as surplus at a previous transaction location or was included with the starting inventory. This reduces or may eliminate the need to travel to the financial institution to transport funds from the financial institution to the cash handling device in order to complete the transaction.

In some arrangements, the cash storage and recycling capabilities on board the transport carrier may include dynamic routing of the transport carrier. For instance, a carrier may have a predetermined or prescheduled route that includes cash handling devices at various locations. The transport carrier may include a central server that is in communication with each carrier and tracks the amount of money, number of bills of various denominations, and the like on board each carrier. Accordingly, the central server may determine a more efficient route for the carrier based on the funds on board. In some arrangements, on demand transaction requests, such as change orders, requests for replenishment, and the like may be transmitted to the central server. Emergency requests may also be generated or initiated. The central server may then route a carrier to the location of the device requesting the on demand transaction. The carrier may be selected based on the funds on board, location of the vehicle, and the like. The on demand transaction may be completed using funds on board the carrier, thereby reducing or eliminating the need to return to the financial institution to obtain funds to complete the transaction.

BRIEF DESCRIPTION OF THE DRAWINGS

The present disclosure is illustrated by way of example and not limited in the accompanying figures in which like reference numerals indicate similar elements.

FIGS. 14A and 14B illustrate example user interfaces for indicating a route of a transport carrier in accordance with aspects described herein.

FIGS. 15A and 15B illustrate alternative user interfaces for indicating a route of a transport carrier in accordance with aspects described herein.

The reader is advised that the attached drawings are not necessarily drawn to scale.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices. The terms currency or cash may include paper money and or coin.

Figure 1:
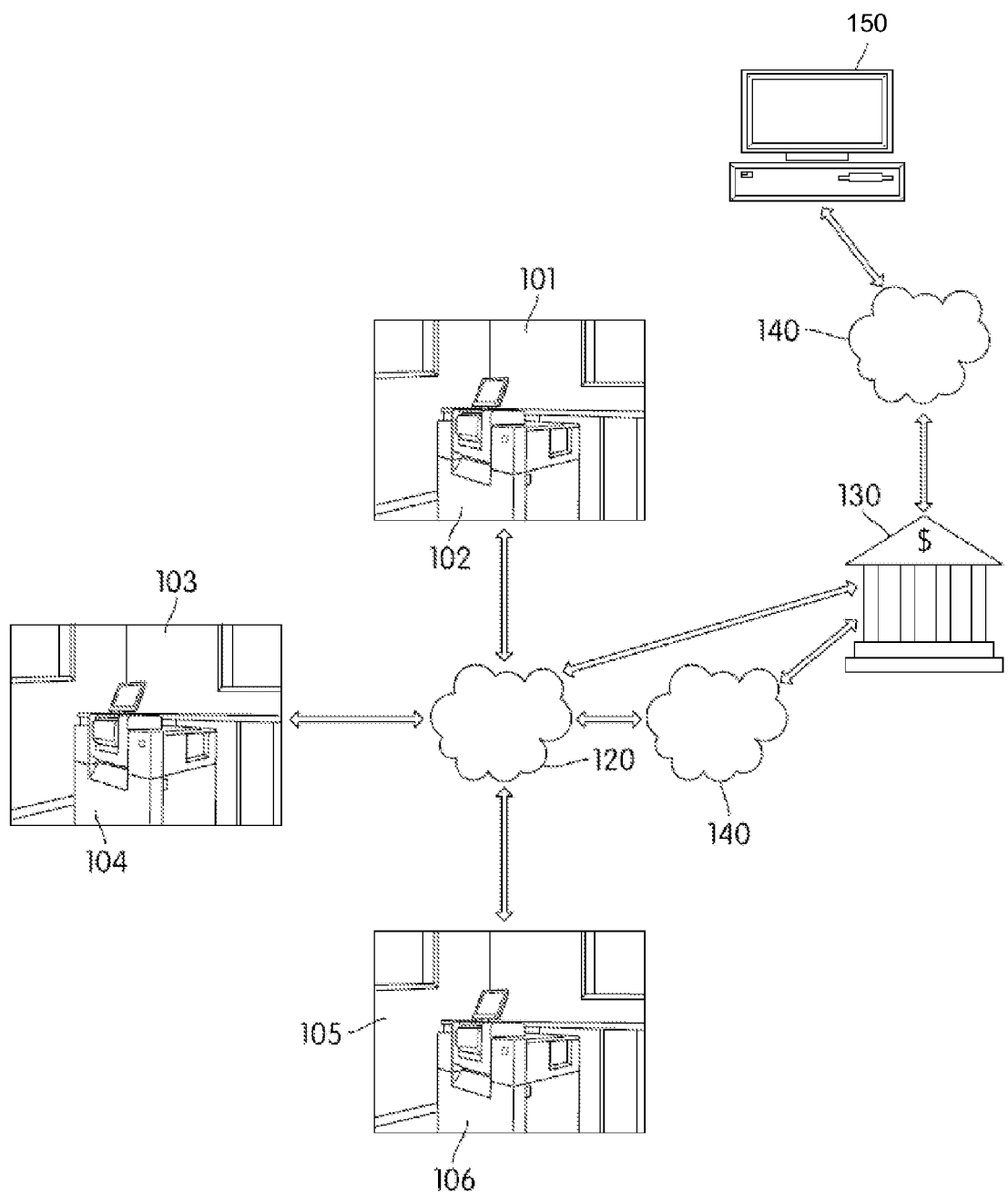
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn. Those skilled in the art will realize that additional devices and facilities that receive, manage, or distribute monetary packages and any combination of the above may be used in conjunction with the arrangements described herein. These facilities may include clients of a financial institution, internal facilities of the financial institution, and/or external partnership facilities (other financial institutions, the Federal Reserve, on-site operations of a customer, and the like).

FIG. 1 further illustrates that cash handling devices (and/or other facilities that receive, manage, or distribute monetary packages) 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
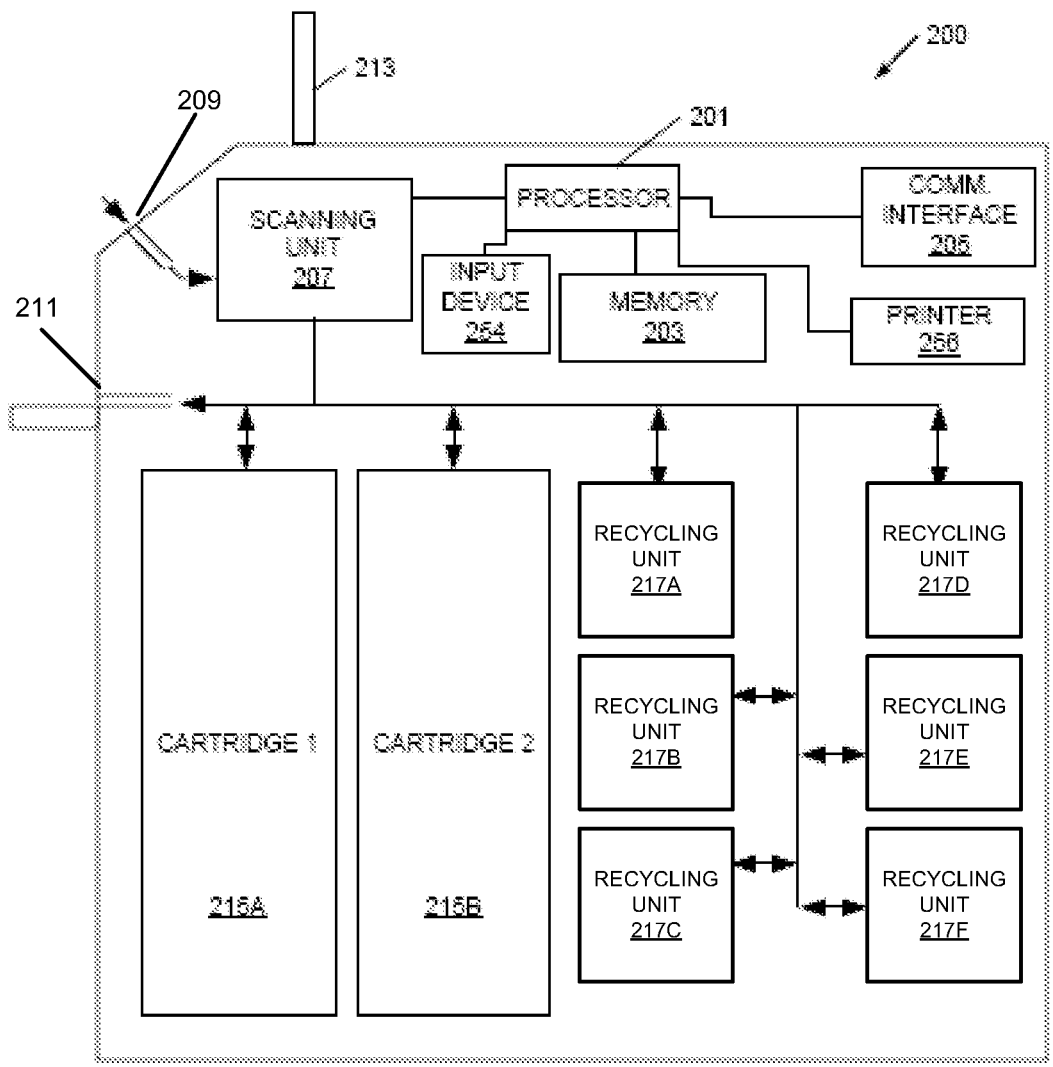
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memory or memories.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217, including stackers, rolled storage modules, and the like, may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, unauthorized reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized reproduction. Scanning unit 207 may send such data to processor 201 which may, in turn, save the data in memory 203. In addition, scanning unit 207 may be configured to scan checks or other non-currency paper items, in addition to paper currency.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Figure 3:
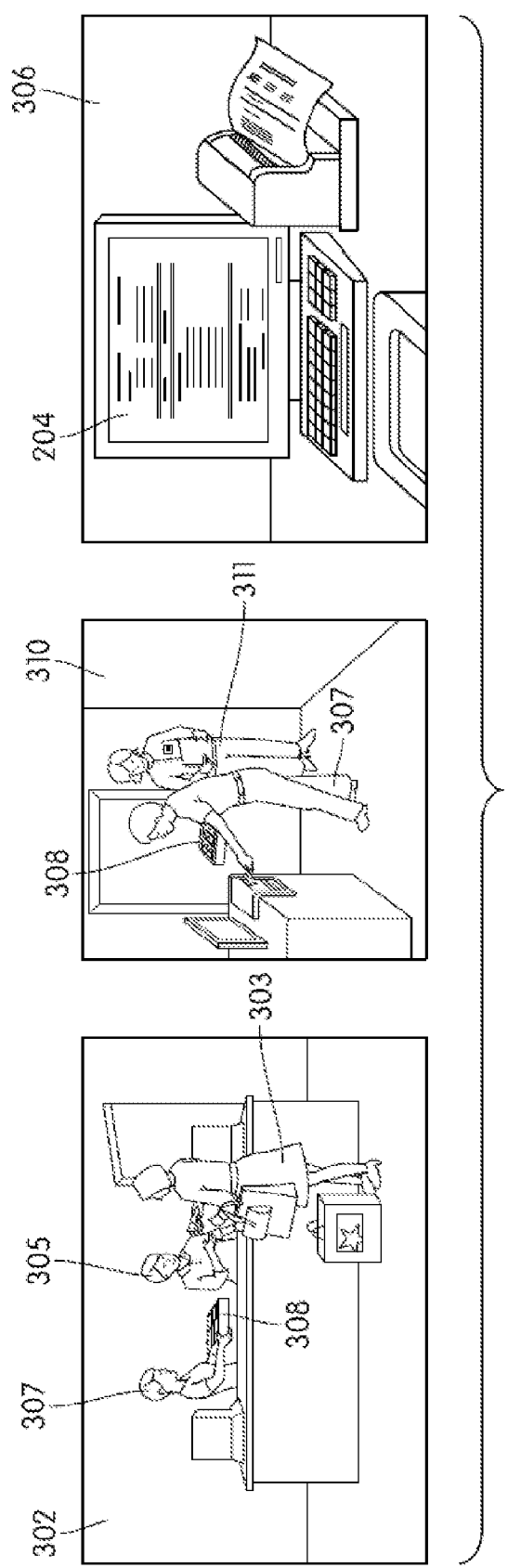
FIG. 3 illustrates various features of a currency recycler that may be used in accordance with aspects of the invention.

FIG. 3 illustrates various features of a cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customers such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
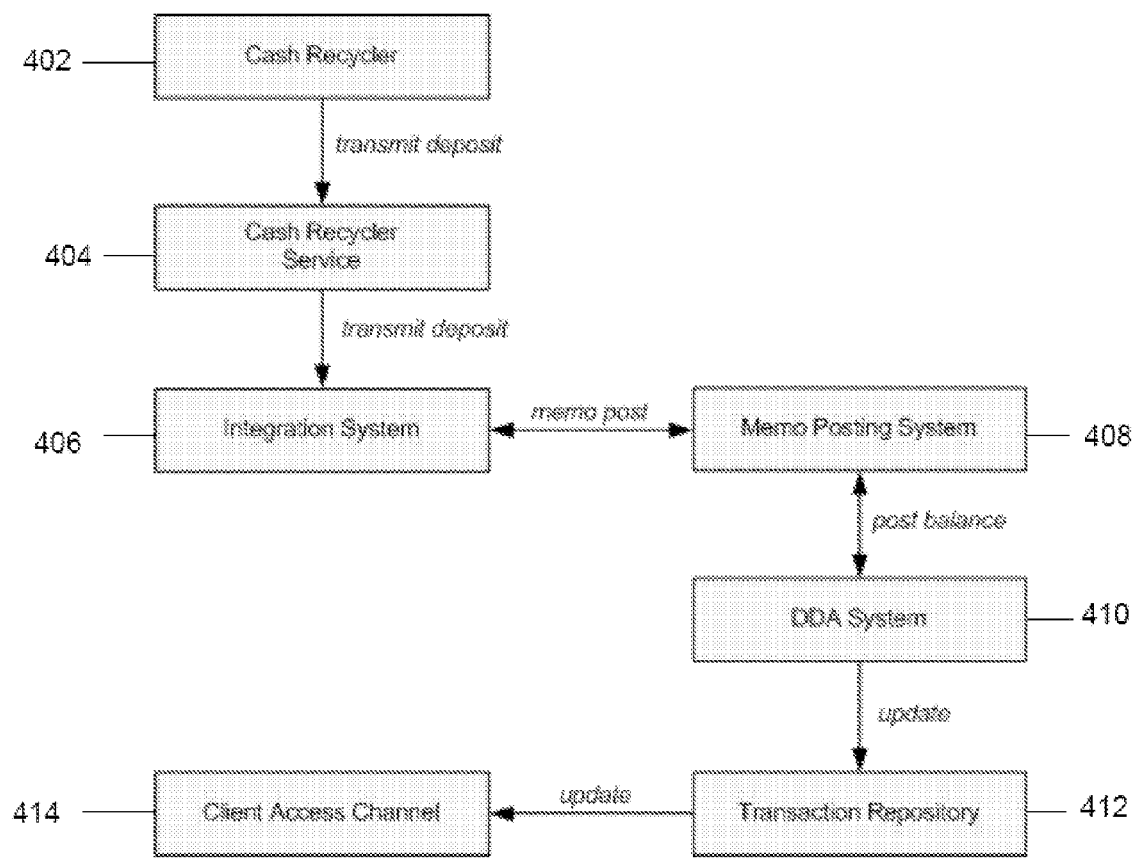
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
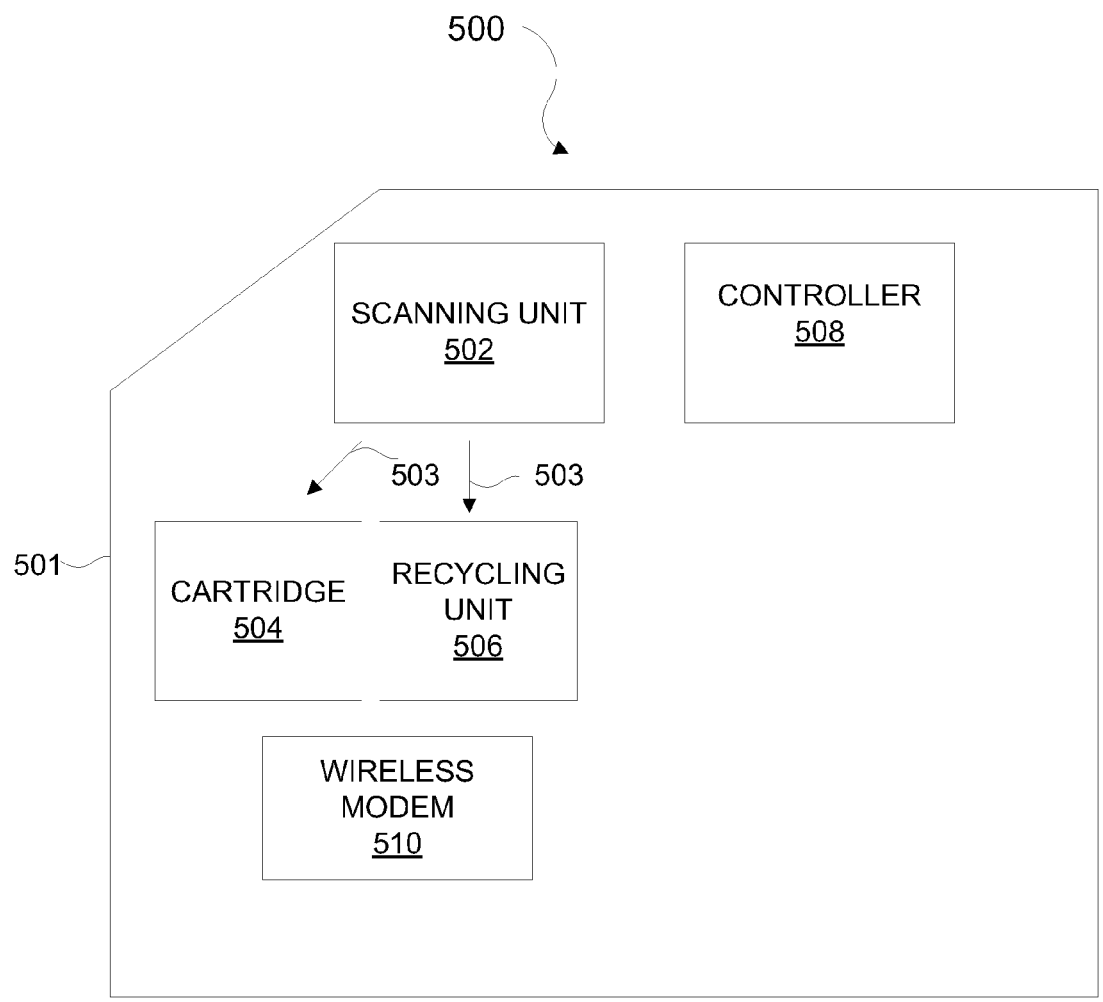
FIG. 5 is a simplified diagram of a currency recycler including various components used in accordance with one or more aspects described herein.

FIG. 5 illustrates one example cash recycler 500 having various components to simplify performance of the cash recycler 500 and improve efficiency of the cash recycler 500.

Figure 6:
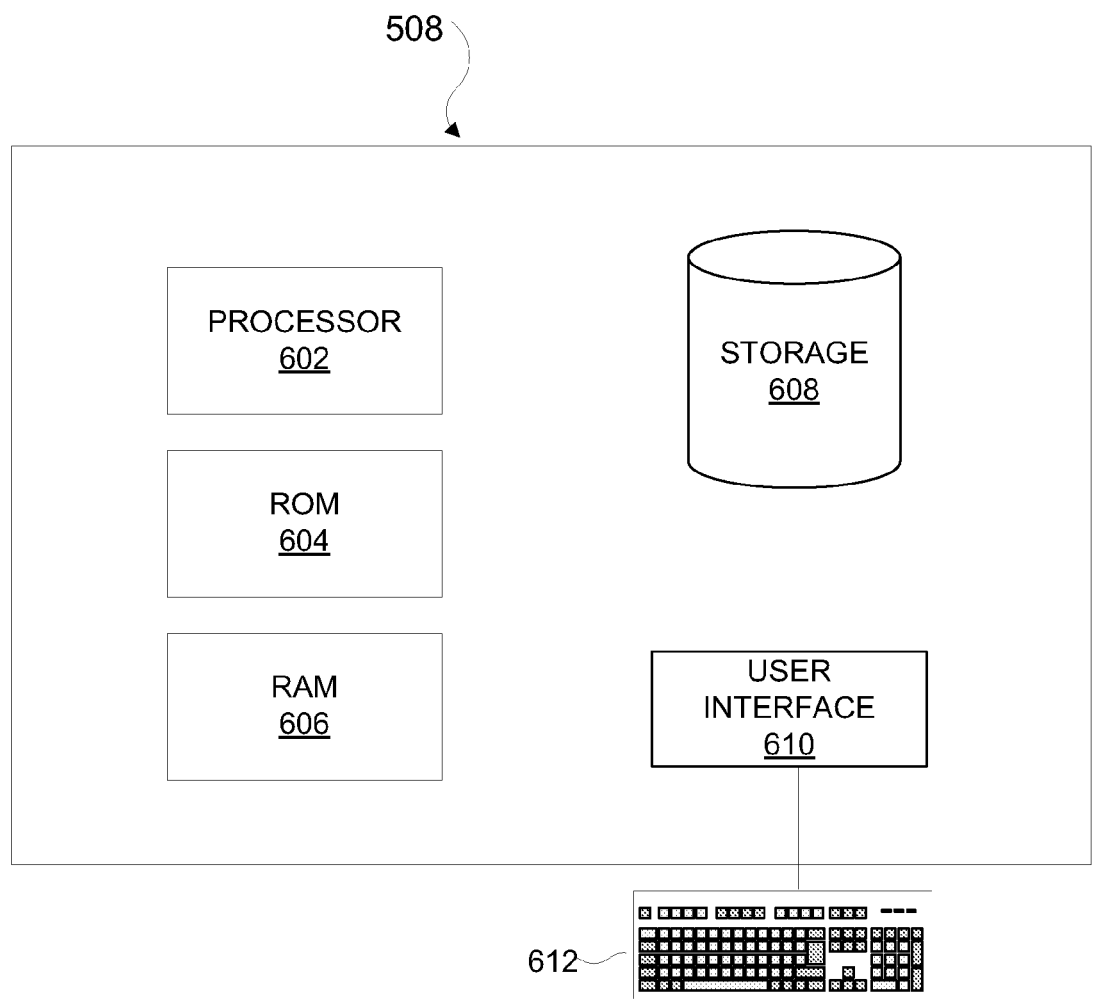
FIG. 6 is a simplified diagram of aspects of the cash recycler and controller of FIG. 5 in accordance with aspects described herein.

With further reference to FIG. 5, the cash recycler 500 or other currency handling device described above may include a controller 508. The cash recycler 500 may include some or all aspects of the cash recycler 200, as shown in FIG. 2. The controller is configured to control the operations of cash recycler 500, including processing transactions including transmitting data to a financial institution for recognition at the financial institution, controlling mechanical systems of the cash recycler 500, controlling access to one or more portions of recycler 500, reconciling logical and physical counts and the like. As shown in FIGS. 5 and 6, the controller 508 may be physically located within the housing of the cash recycler, e.g., as part of a cash recycler housing 501, or as a separate component. The controller 508 generally includes a processor 602. Controller 508 may further include memory such as RAM 606 and ROM 604. In addition, the controller may include or have access to storage 608 and a user interface 610. The user interface 610 may include a display as well as various input devices such as a keyboard 612, mouse, and the like. In some arrangements, the display may be a touch-sensitive display thereby allowing user input to be received through the display. Additionally or alternatively, the user interface may be configured to receive voice commands. The controller may further be configured to control various peripheral devices, such as a printer, external storage device, and the like using one or more adapters and interfaces (not shown).

The controller 508 is configured to execute software for providing functionality to the cash recycler 500. For instance, the controller 508 executes commands as directed by the software to control transactions made using the currency recycler 500, communicate with the financial institution or other entity, provide outputs via the user interface 610 or a peripheral device, such as a printer, and also to physically move the currency within the cash recycler 500.

For example, a user may deposit $1000 into the cash recycler 500. The user provides input through the user interface 610 regarding the deposit. This user input may include selection from a display, voice commands, and the like. The money is then deposited into the cash recycler 500. In one arrangement, the controller 508, in response to various instructions provided by the software, may control the mechanical systems of the cash recycler 500, as well as the electronic (e.g., computer) systems of the cash recycler 500. For instance, the controller 508 may operate the mechanical system that controls the flow of currency into the machine during a deposit. In another arrangement, the controller 508 may house the software configured to send and receive instructions to an additional driver or controller that controls the flow of currency. These mechanical systems are not shown in the figures but are indicated by arrows 503. In addition, the controller 508 controls the scanning device 502 to scan each bill inserted into the cash recycler 500 to confirm authenticity and to verify the condition of the bill. If a bill is deemed an unauthorized reproduction it will be removed from circulation and stored in a separate region of the cash recycler 500. The controller 508 will engage various mechanical systems to store the bill in the separate region. If the bill is deemed too worn to be returned to circulation, the mechanical systems run by the controller 508 will remove the bill and place it in a separate region for storage. If the bill is deemed suitable to return to circulation it will remain with the bills in the recycler 500 that may be withdrawn from the recycler 500. Further, controller 508 may reconcile a deposit amount specified by a depositing user and a physical count of the currency actually deposited to insure accuracy and integrity. In addition, the controller 508 will store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

In some arrangements, the cash recycler 500 may be a hardened device. That is, the cash recycler 500, along with controller 508, may be constructed in a secure manner such that cash recycler 500 and controller 508 might not be easily reconfigured. For example, a controller such as controller 508 may be integrated into cash recycler 500 using application specific circuits, dedicated hardware connections and components and the like that might not be easily disrupted or reconfigured. This may prevent intruders from gaining unauthorized access to the cash recycler system by, e.g., by merely disconnecting an external controller.

Additionally or alternatively, access to the various functions of the cash recycler 500 may be password protected or may require other authorization and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to gain unauthorized access to the controller 508 and bypass such security measures.

Figure 7:
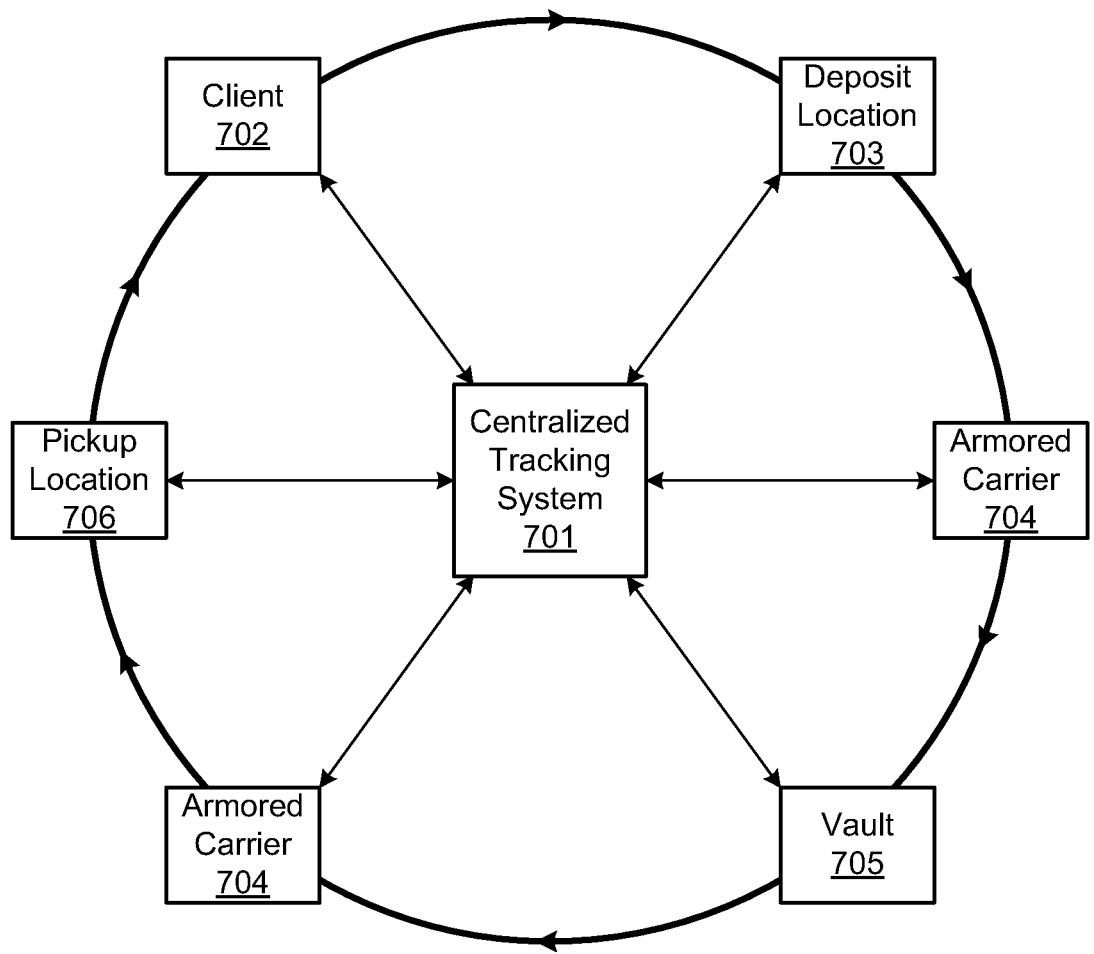
FIG. 7 is a graphical depiction of an illustrative cash supply chain for a deposit/withdrawal lifecycle, including a centralized tracking system.

FIG. 7 is a graphical depiction of an illustrative cash supply chain for a monetary item deposit/withdrawal lifecycle. In this example, a centralized tracking system 701 communicates with various parties, such as a bank client 702, a deposit location 703, an armored carrier 704 or other transport service, a bank vault 705, and a pickup location 706. Communication between centralized tracking system 701 and the various parties 702-706 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, items may be processed internally within a node (e.g., within bank vault 705). Consequently, each node may have a network within itself.

Centralized tracking system 701 may include at least one computing device and at least one computer-readable medium that, together, are configured to receive monetary package status reports from parties such as parties 702-706, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 701 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 7, bank client 702 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 702 may receive a notification of an event along the cash supply chain at phone 702a or terminal 702b through a wireless network or the Internet.

Deposit location 703 is the location at which client 702 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 706 is the location at which client 702 receives custody of the monetary items (which may or may not be prepared by client 702 and which may be in the form of a monetary package), such as from an armored carrier, bank teller, or cash handling device.

Vault 705 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 704a/704b (which may be referred to as a "vendor") transports monetary packages between different stages along the cash supply chain typically in an armored vehicle. The physical transportation could be any type of transportation, however, including a courier or package delivery service with a secured package.

Parties 702-706 may communicate with centralized tracking system 701 over corresponding communications channels. Different types of communications channels may be supported. For example, centralized tracking system 701 may communicate with client 702 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 8:
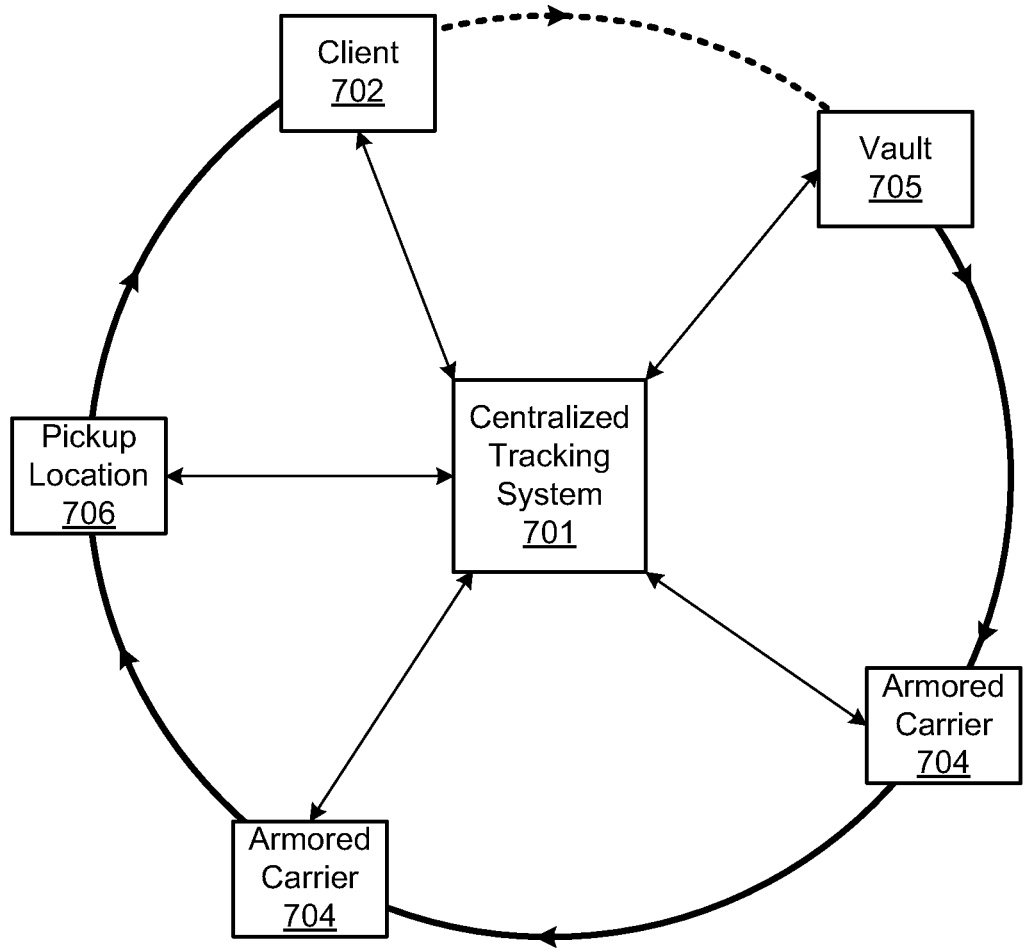
FIG. 8 is a graphical depiction of an illustrative cash supply chain for a change order lifecycle, including a centralized tracking system.

FIG. 8 is a graphical depiction of an illustrative cash supply chain for a change order lifecycle. A change order is a financial transaction in which a client (such as client 702) requests and receives a predefined sum in a predefined set of one or more denominations. For example, client 702 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 7 and 8, a monetary package transfers from party to party, with the exception of the broken line in FIG. 8 that indicates a request by client 702 rather than a physical transfer of a monetary package. Each time the monetary package changes hands and/or changes physical locations, centralized tracking system 701 may be updated. A physical location may be two different nodes, or within the same node, of the cash supply chain. For example, monetary items are typically moved from receiving of a vault to a teller of the vault. In addition, any of these parties (or even other parties not shown) may at any time query centralized tracking system 701 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 9:
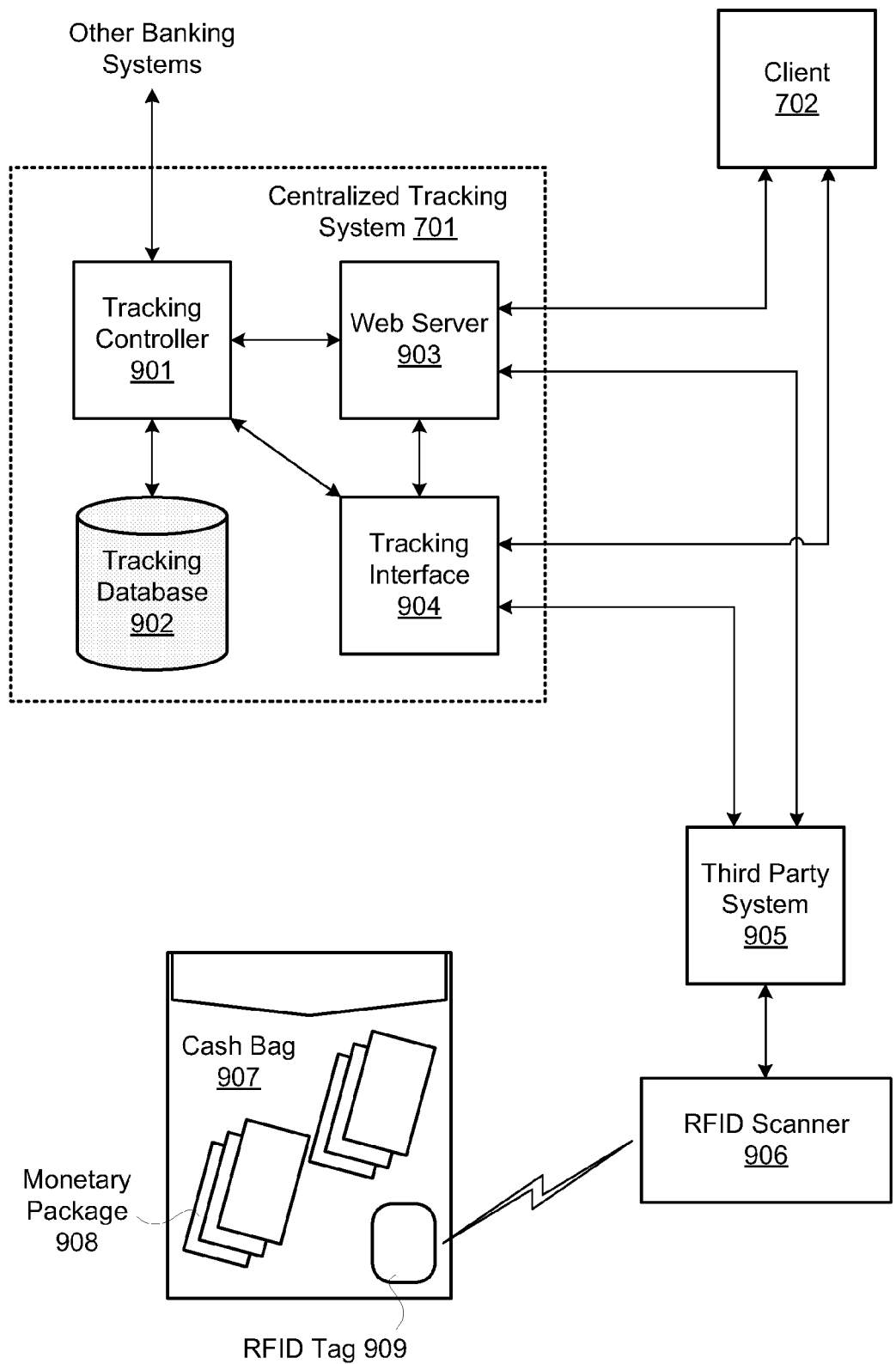
FIG. 9 is a functional block diagram of an illustrative monetary package tracking environment.

FIG. 9 is a functional block diagram of an illustrative monetary package tracking environment. In this example, centralized tracking system 701 is shown to include a tracking controller 901, tracking database 902, a web server 903, and a tracking interface 904. Each of units 901, 903, and 904 may be implemented as or otherwise include a computing device. It should be noted that the divisions between functional blocks in FIG. 9 is merely illustrative, and that the physical division of computing devices and other equipment may be different from the functional division. Moreover, some or all of the functional blocks may be combined or further subdivided functionally and/or physically.

Tracking database 902 may be implemented as or otherwise include a computer-readable medium for storing data. This data may be organized, for instance, as a relational database that is responsive to queries such as structured query language (SQL) queries. Tracking database 902 may be distributed and may collaborate with internal and/or external sources to fulfill the completeness of the data utilized for notifications.

In this example, tracking controller 901 may be configured to add, edit, update, delete, and query data stored in tracking database 902. The data stored in tracking database 902 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 903 may be configured to generate an Internet web page that is accessible by client 702 and/or other parties. The web page may be used to query tracking database 902 via tracking controller 901. For example, a party using the web page may be able to enter an identifier associated with a monetary package. In response, web server 903 may request tracking controller 901 to query tracking database 902 (or alternatively web server 903 may generate the query itself) for that identifier. The query response is forwarded by tracking controller 901 to web server 903, and displayed on the web page for review by the party. The query response may include, for instance, the status data associated with the identifier. Many other types of query transactions are possible. In addition, updates, deletions, and additions may be made to the data in tracking database 902 via the web page generated by web server 903. For example, a party may desire to update status information about a particular monetary package via the web site, or may desire to add a new monetary package with a new identifier not previously included in tracking database 902.

Tracking interface 904 may be used as an alternative interface into tracking controller 901 and tracking database 902, without the need for an Internet web page. For example, data and queries may be provided to tracking controller 901 via tracking interface 904 using a short messaging system (SMS) message or other type of messaging from a cellular telephone.

FIG. 9 further shows an example of a third party system 905 (e.g., the computer system of armored carrier 704). System 905 may be embodied as or otherwise include a computing device, and may further include or be coupled with an identifier reader such as an RFID scanner 906 or a bar code reader. In this example, RFID scanner is configured to read an RFID tag 909 that is contained inside or otherwise attached to a bag 907 that also contains a quantity of monetary items 908. Using such a setup, the third party may, for example, read the identifier stored in RFID tag 909 using RFID scanner 906 (which may be a handheld or fixed location device), forward that identifier to tracking interface 904 or web server 903 along with the current status of bag 907 (e.g., in custody of the bank vault at a certain time and date). This current status may be added to the data in tracking database 902 and associated with the identifier. Then, when that party or another party later queries tracking database 902 for the same identifier, the status of bag 907, including the most recent status discussed above, may be returned in response to the query.

RFID tag 909 may be a passive RFID tag that does not contain its own power source. Rather, a passive RFID tag (e.g., its memory, controller, and transmitter) is powered by power inherent to a signal that is received from RFID scanner 906 or another signal source. Alternatively, RFID tag 909 may be an active RFID tag that contains its own power source.

The above discussion in connection with FIGS. 7-9 describes but a few examples of how monetary package tracking might be implemented. These and other implementations, as well as various features that may be provided in connection with monetary package tracking, will be discussed in further detail below.

As discussed above, conventional systems often require a change order to be placed with a financial institution in order to provide additional funds. The funds may include paper money and/or coin. Additionally or alternatively, the cash handling device may request a pick up of funds from the device with the financial institution. In some arrangements described herein, the transport carrier (i.e., armored truck, and the like) used to facilitate replenishment or pick-up of funds may be used as a type of "cash on wheels" to provide replenishment and pick-up of funds without the funds being transported from the financial institution. The funds may be transported by other known means of transportation. In some examples, the transport carrier may be owned, managed, and the like by the financial institution.

Figure 10:
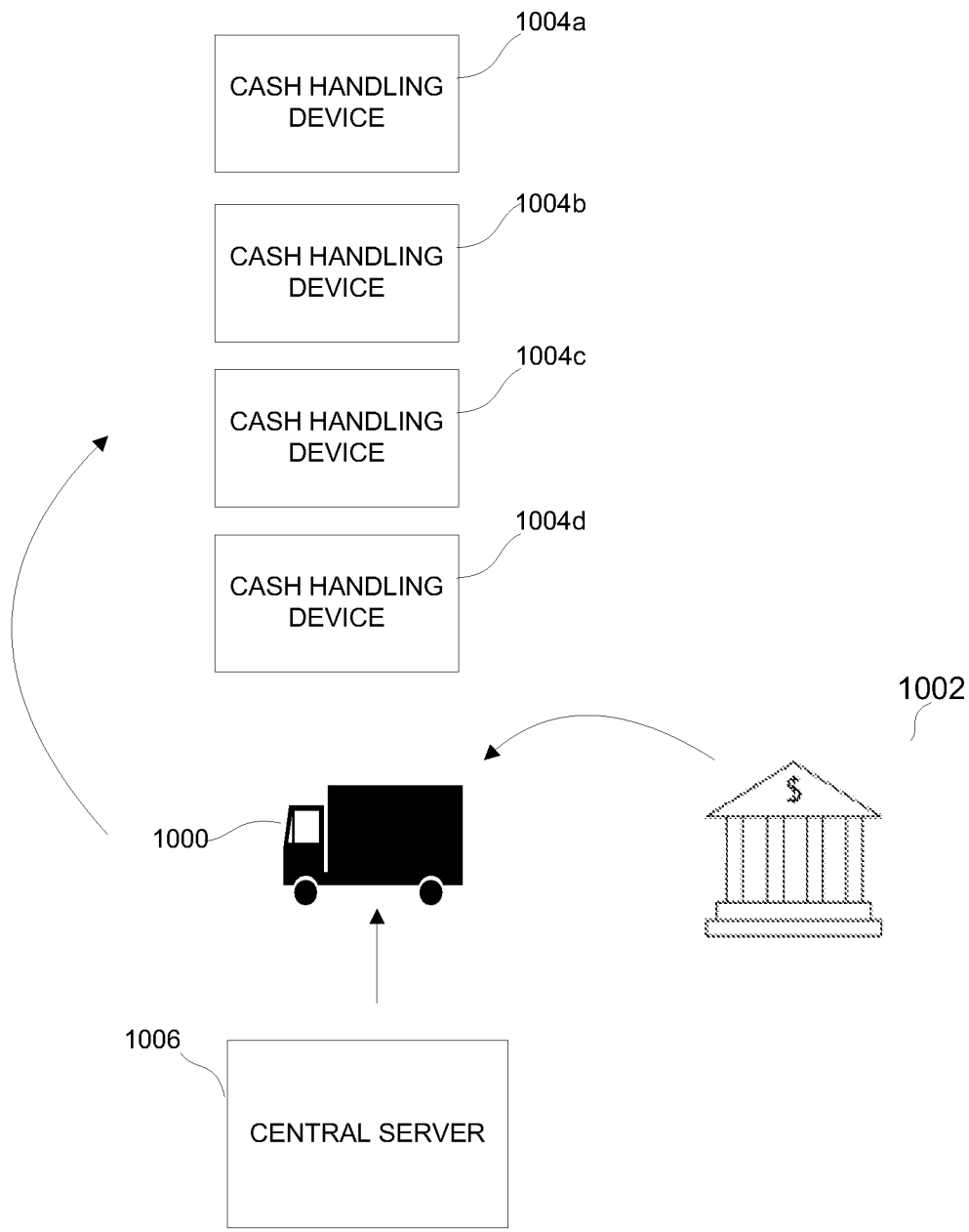
FIG. 10 is a simplified diagram of one cash transfer system in accordance with aspects described herein.

For instance, the transport carrier may include various cash recycler capabilities that, in conventional systems, are only available at the financial institution. That is, the transport carrier may include various funds, such as replenishment cartridges, and the like that may be used to replenish a supply of bills at a cash handling device. Additionally or alternatively, the transport carrier may include means of sorting and strapping funds, such as a sorter or a discriminator. Further, the transport carrier may be in communication with the cash handling device to permit requests for replenishment of funds, or pick-ups of funds, to be made directly to the carrier. FIG. 10 illustrates one example system of this "cash on wheels" arrangement. As shown, a transport carrier 1000 includes a variety of funds, such as replenishment cartridges, and the like that it may obtain from a financial institution 1002, for example, at the start of a transport route. The transport carrier 1000 may obtain funds of various denominations, including paper currency and coin. Additionally or alternatively, the transport carrier 1000 may obtain empty cartridges that may be used to store funds picked up from a cash handling device or may be inserted into a cash handling device to replace a cartridge removed, i.e., a full overflow cartridge may be removed from a cash handling device and replaced with an empty cartridge.

The transport carrier 1000 may then leave the financial institution 1002 to begin a transport route. Throughout the route, the carrier 1000 may be in communication with both the financial institution 1002 and/or one or more cash handling devices 1004. As a cash handling device 1004 is in need of replenishment or pick-up, the device 1004 may communicate that need directly or through the communication networks described above to the transport carrier 1000 which will then route the carrier 1000 to the cash handling device 1004 to provide the desired replenishment or pick-up. In some arrangements, the request for change order may be communicated to a central server 1006 which will then forward the request to a truck 1000 that is determined to be carrying the desired replenishment denominations, amount, and the like.

The cash handling devices 1004 transacted may include a number of different cash handling devices, such as ATM's, cash recyclers, depository only machines, and the like. The cash transacted may be transferred within and between various types of devices, at various locations, and the like. Another example of this transfer between various types of devices, locations, and the like will be discussed more fully below with respect to FIG. 16.

Figure 11:
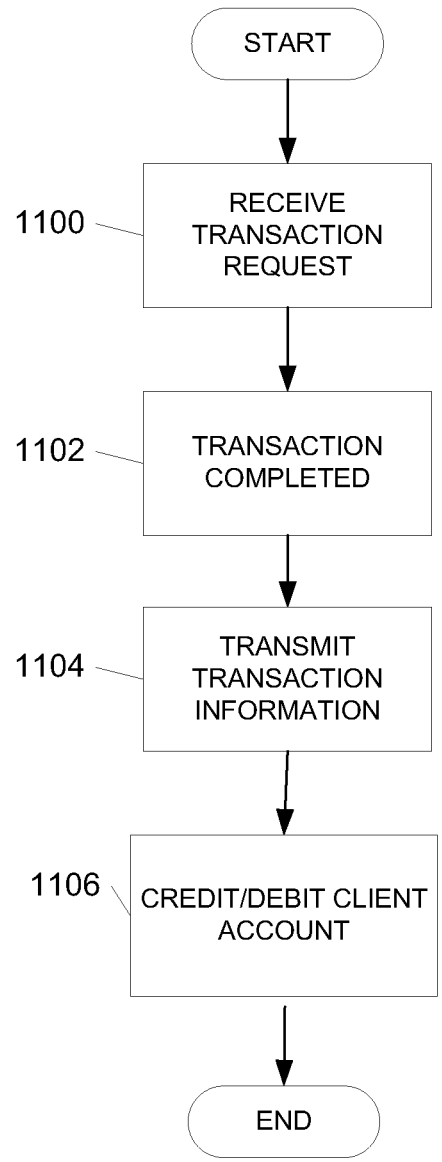
FIG. 11 illustrates one example method of providing replenishment or pick-up services to one or more cash handling devices in accordance with aspects described herein.

FIG. 11 illustrates one example method of using this "cash on wheels" system. In step 1100, a transaction request is received at the transport carrier. The transaction may be change order request, pick-up request, and the like. The request may be a pre-scheduled change order request or an on-demand type of request. In step 1102, the transport carrier provides the desired service (i.e., replenishment, pick-up, and the like) from the inventory of cash, coin, cartridges, and the like in the carrier. In some arrangements, the service is provided using funds and/or cartridges, and the like already in the carrier and does not require any additional pick-ups, contact, and the like with the financial institution. In step 1104 the transaction information is transmitted to the financial institution and the funds are debited or credited to a client account at the financial institution in step 1106. In some arrangements, this may be part of a notification of the transaction that is transmitted from the transport carrier to the financial institution. The notification may also include information such as denominations, variance to actual versus predicted, and the like.

Figure 12:
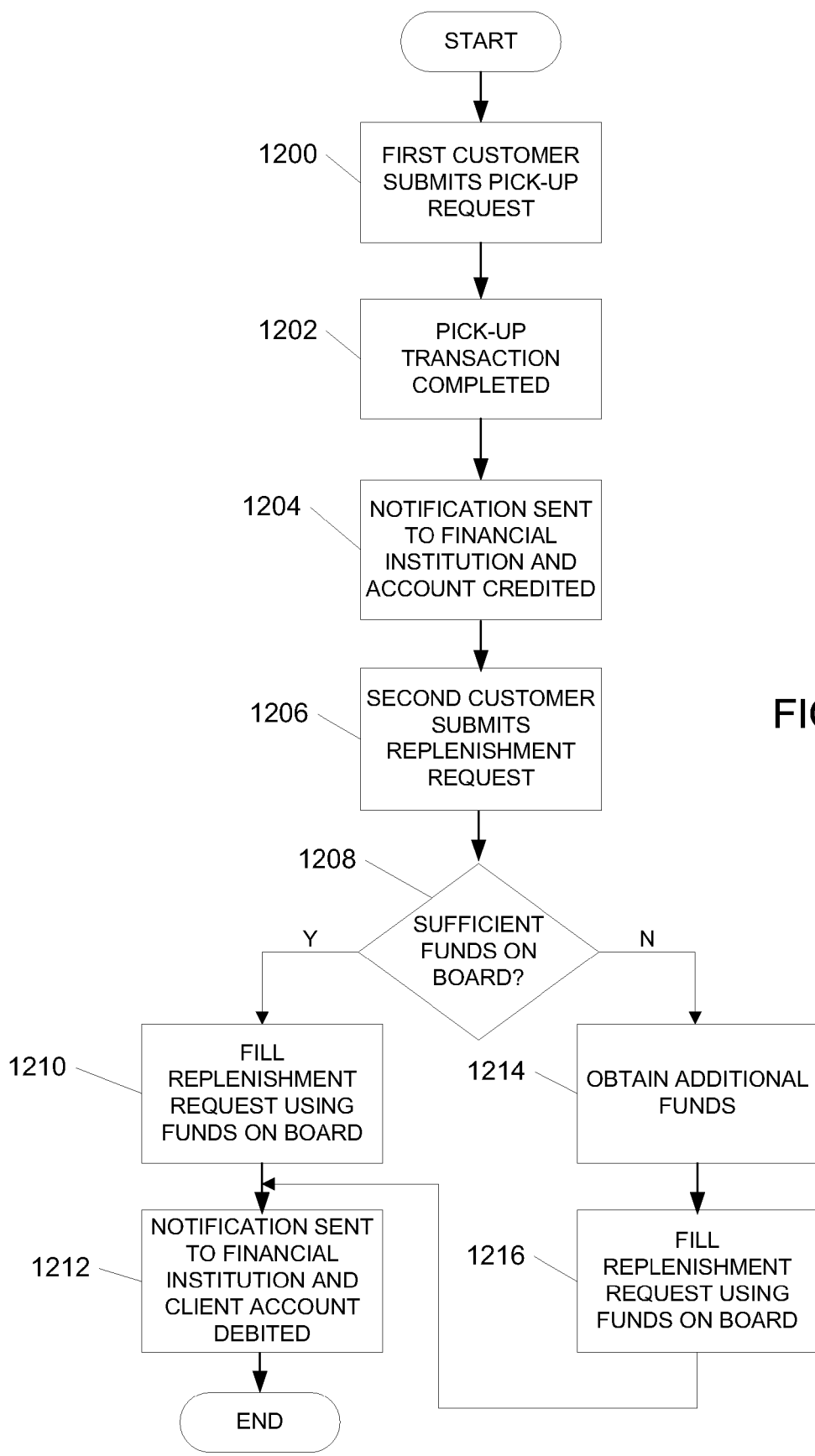
FIG. 12 illustrates another example method of providing replenishment or pick-up services to one or more cash handling devices in accordance with aspects described herein.

As discussed above, these arrangements permit traditional storage and/or recycling capabilities to be housed directly on the transport carrier vehicle. This allows funds from one customer to be used to fill the needs of another customer without requiring additional funds from a financial institution. FIG. 12 illustrates another example method of using the "cash on wheels" system. In step 1200, a first customer submits a pick-up request directly to the transport carrier. The request may be made as a prescheduled request or as an on-demand request. In step 1202, a vehicle associated with the transport carrier will complete the pick-up transaction at the first customer. A notification of the transaction is transmitted to the financial institution in step 1204 and the client account is credited. In step 1206, a second customer submits a replenishment request. The request may be submitted as a prescheduled request or as an on-demand request. In step 1208 it is determined whether the vehicle has sufficient funds on board to fulfill the replenishment request. If yes, the transport carrier may fill the replenishment request for the second customer using some or all of the funds from the pick-up at the first customer in step 1210. The devices located at the first customer and the second customer at which transactions are occurring may be the same type of device (i.e., first client device is an ATM, second client device is an ATM; first client device is a depository only machine, second client device is a depository only machine, and the like) or different types of devices (i.e., first client is a depository machine pick-up, second client is ATM replenishment; first client is ATM pick up, second client is cash recycler drop off, and the like). A notification of the transaction will be sent from the transport carrier to the financial institution in step 1212 and the client account will be debited. If no, the vehicle may obtain additional funds in order to meet the request in step 1214. In some arrangements, the vehicle may return to the financial institution to obtain the additional funds. In other arrangements, the vehicle may perform additional pick-up transactions to obtain the desired funds and will complete the replenishment request when the desired funds are obtained, as in step 1216.

By placing the cash storage and recycling capabilities in the transport carrier, the clients are provided with a more efficient transport system that may save time, i.e., time to obtain funds to complete pick-up, and/or money, i.e., costs associated with additional travel to/from financial institution, and the like. In addition, the system allows for more dynamic routing of vehicles in the transport carrier fleet.

For instance, in conventional systems, a vehicle may have a predefined or predetermined route for making drop-offs and/or pick ups. The route may be predetermined for an entire shift or just a portion of the shift. The route may include one or more trips to the financial institution to drop off funds, pick up funds, communicate various transaction information, and the like. By placing at least some cash storage and recycler in the vehicle, or at a location such as a carrier or financial institution vault or branch banking center within the vehicles route, the route of the vehicle may be changed depending on the funds on board at any given time in order to provide an efficient transport carrier system.

In one arrangement, the transport carrier may include a central database that is in communication with all vehicles and includes information regarding cash amounts on board, customer needs, prescheduled pick-ups or change orders, and the like. The central database may provide feedback to each individual vehicle in order to provide a more efficient route.

Figure 13:
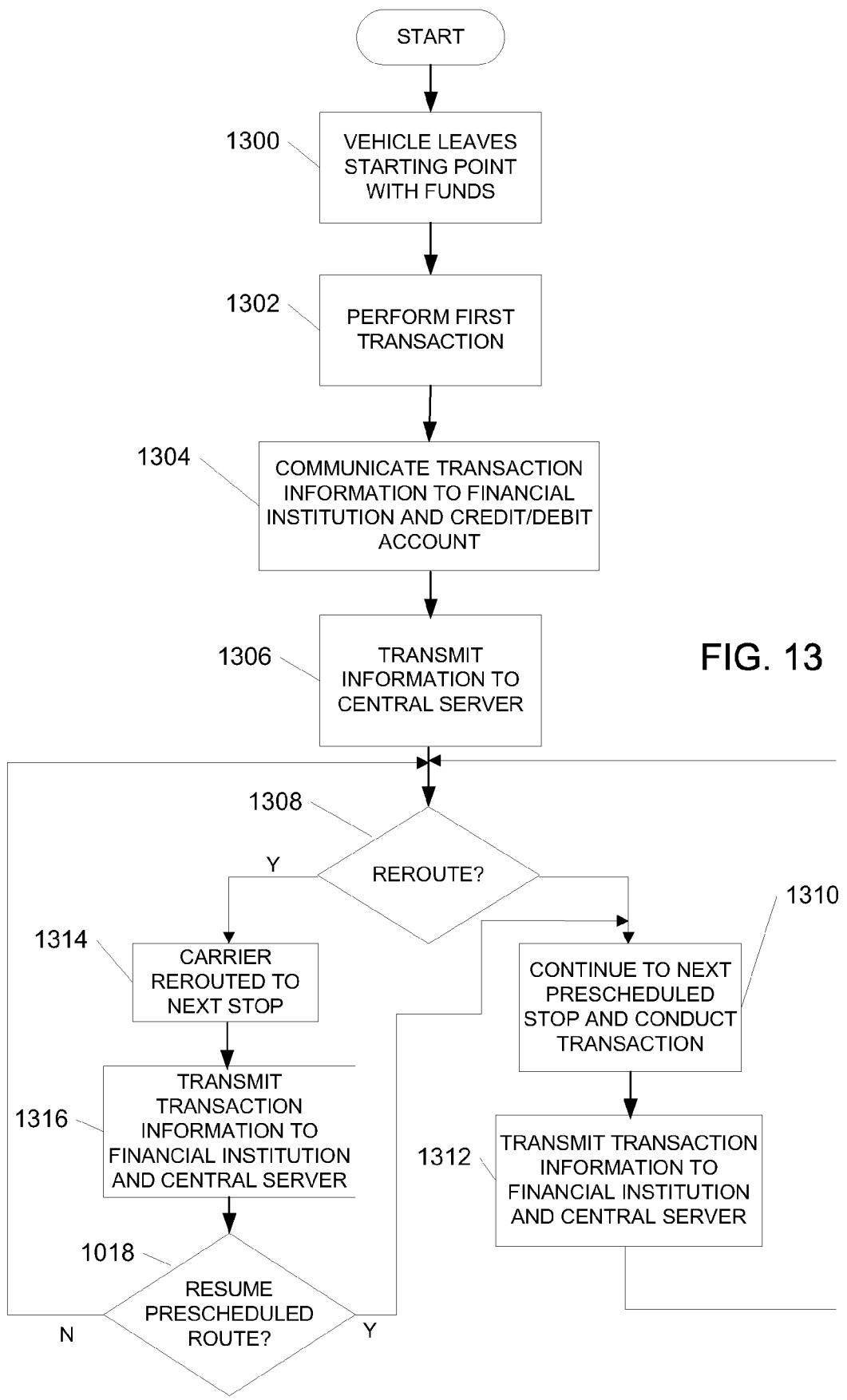
FIG. 13 illustrates yet another example method of providing replenishment or pick-up services to one or more cash handling devices in accordance with aspects described herein.

FIG. 13 illustrates one example method of dynamic routing of transport carriers based on the funds on board the carrier. In step 1300, a vehicle may leave a starting point, such as a financial institution, with a predetermined amount of money on board and with one or more prescheduled stops along a route. The predetermined amount of money, i.e., number of bills of various denominations, coin of various denominations, and the like may be a standard amount that is used for loading every carrier or may be based on predicted needs of the customer or customers that carrier will be servicing. In step 1302, the transport carrier will make a stop to perform a transaction. The transaction may be filling a change order (i.e., replenishing a certain denomination of bills, and the like) or may be a pick-up, such as picking up a surplus number of bills of a certain denomination. Once the pick up is complete, the transaction information is communicated to the financial institution and the client account is debited or credited, as in step 1304. In addition, the information may be communicated to the central server in step 1306. In step 1308 a determination is made as to whether, based on the previous transaction, the vehicle should continue to the next prescheduled stop on the route or if the route should be changed to provide a more efficient routing. If the carrier is to continue on the predetermined route, the carrier will continue to another prescheduled stop and conduct the appropriate transaction in step 1310. The transaction information will be communicated to the financial institution, the client account will be debited or credited, and the information will be transmitted to the central server in step 1312. The method then returns to step 1308 to determine if the carrier should continue on the prescheduled route or change based on the previously completed transactions.

If it is determined in step 1308 that the route should change, i.e., based on an on-demand or other request that has been transmitted to the central server, in step 1314 the carrier will be directed to a stop other than the prescheduled stop. This stop may include a transaction that may be completed using funds already on board the carrier and, in some arrangements may include using funds collected at one or more previous transaction stops. Once the transaction is complete, the transaction information will be transmitted to the financial institution to debit or credit the client account and to the central server to further determine the route of the carrier, as shown in step 1316.

For instance, if a carrier picks up a surplus of $20 bills from a first client at a first stop. This information may be transmitted to the financial institution to credit the client account and to the central server. The central server may have received a change order, such as an on-demand change order, request to replenish $20 bills at a second client at a second stop. The devices at the first and second client stops may be the same type of device or may be different types of devices. The carrier route may be changed to reroute the carrier to the second client at the second stop after picking up the surplus bills at the first client, rather than continuing to the prescheduled next stop. The change order at the second client may then be filled using the surplus bills picked up at the first client. This information is transmitted to the financial institution, as well as the central server. In step 1318 a determination is made as to whether the carrier will resume the prescheduled route or continue to a new location as determined at the central server based on the funds on board the carrier and the upcoming transactions, fund requests, and the like transmitted to or stored at the central server.

This dynamic routing may permit optimization of the transport carrier route in order to provide an efficient system of transactions at various devices, locations, and the like. Additionally or alternatively, other factors may be included in the dynamic routing aspect. For instance, routing may be based on funds on board the carrier or anticipated to be on board the carrier, as described above and/or customer service level agreements, cash levels, cross-shipping, and the like.

In some arrangements, the next stop for the carrier may be transmitted to the carrier after completion of the transaction at the present stop. In other arrangements, the central server may anticipate the funds on board the carrier based on the expected transaction at the present stop or an upcoming stop and may determine the next stop based on this anticipated amount. FIGS. 14 and 15 illustrate example user interfaces showing the carrier route.

In FIG. 14A, the user interface 1400A indicates a prescheduled carrier route that has been transmitted to a transport carrier. In some arrangements, this route may be transmitted from the central server. The carrier is scheduled to make various stops 1402A-1402D. As the carrier proceeds along the prescheduled route the central server may reroute the carrier, as described above. FIG. 14B illustrates one example user interface 1400B of the carrier being rerouted. As shown, stop 1 1402A remains on the schedule. In this arrangement, the transaction at stop 1 1402A may be complete and the central server has determined that a reroute would be advantageous. Accordingly, the user interface indicates that the prescheduled stop 1 1402B is no longer the next stop. This may be indicated by graying out the area associated with the stop, sending an alert, and the like. The central server then transmits a new stop for the carrier, such as reroute stop 2A 1404. The carrier will then proceed to stop 2A, complete the transaction and await a determination of the next stop from the central server.

FIG. 15 illustrates example user interfaces in which the central server may anticipate the outcome of one or more transactions and determine the subsequent stops based on this information. For instance, user interface 1500A in FIG. 15A indicates a prescheduled route having a plurality of stops 1502A-1502D. As the carrier is completing the route, various on demand change order requests and/or pick-up requests are received at the central server. The server will then anticipate the funds on board the carrier and reroute the carrier based on this information. FIG. 15B illustrates a user interface 1500B indicating the rerouted schedule for the carrier. The route now includes reroute stop 1504. Once the reroute stop is complete, the carrier may continue on the prescheduled route making stops 1502B-1502D. The carrier may continue on this new schedule unless or until the central server further reroutes the carrier.

In addition to the advantages described herein, the systems and methods described herein may optimize inventory flow (such as cash flow) for the financial institution resulting in reduced inventory and improved productivity. In addition, clients of the financial institution may experience a reduction in change order completion time because the client may have already received credit in their account for the deposit in the cash recycler. That is, the client may receive verified funds within minutes of depositing bills in the recycler instead of days after transferring the cash to the transport carrier.

In another aspect, the transportation plan may be constructed or revised in real time in connection with cash inventory levels at the different cash handling devices and may be communicated to a carrier via, for example, a mobile device such as a laptop, hand-held computer, a mobile phone, and the like. By utilizing real-time inventory levels, updates to the transportation plan may improve the efficiency of cash transfers, e.g., replenishing or retrieving surplus cash. By monitoring inventory levels, carriers may be advised of servicing needs throughout the day. In addition, there may be real-time assessments of a particular carrier unit. For example, as change orders are requested by a cash handling device, a central processing center may determine whether a particular carrier unit is in the local are using e.g., Global Positioning System (GPS) and if so, whether the particular carrier unit has sufficient cash and/or cartridges to handle the request. Aspects of this arrangement are discussed in U.S. patent application Ser. No. 12/277,955, filed Nov. 25, 2008, and entitled "Cash Handling Device-To-Cash Handling Device Money Movement," the disclosure of which is incorporated by reference herein in its entirety.

Figure 16:
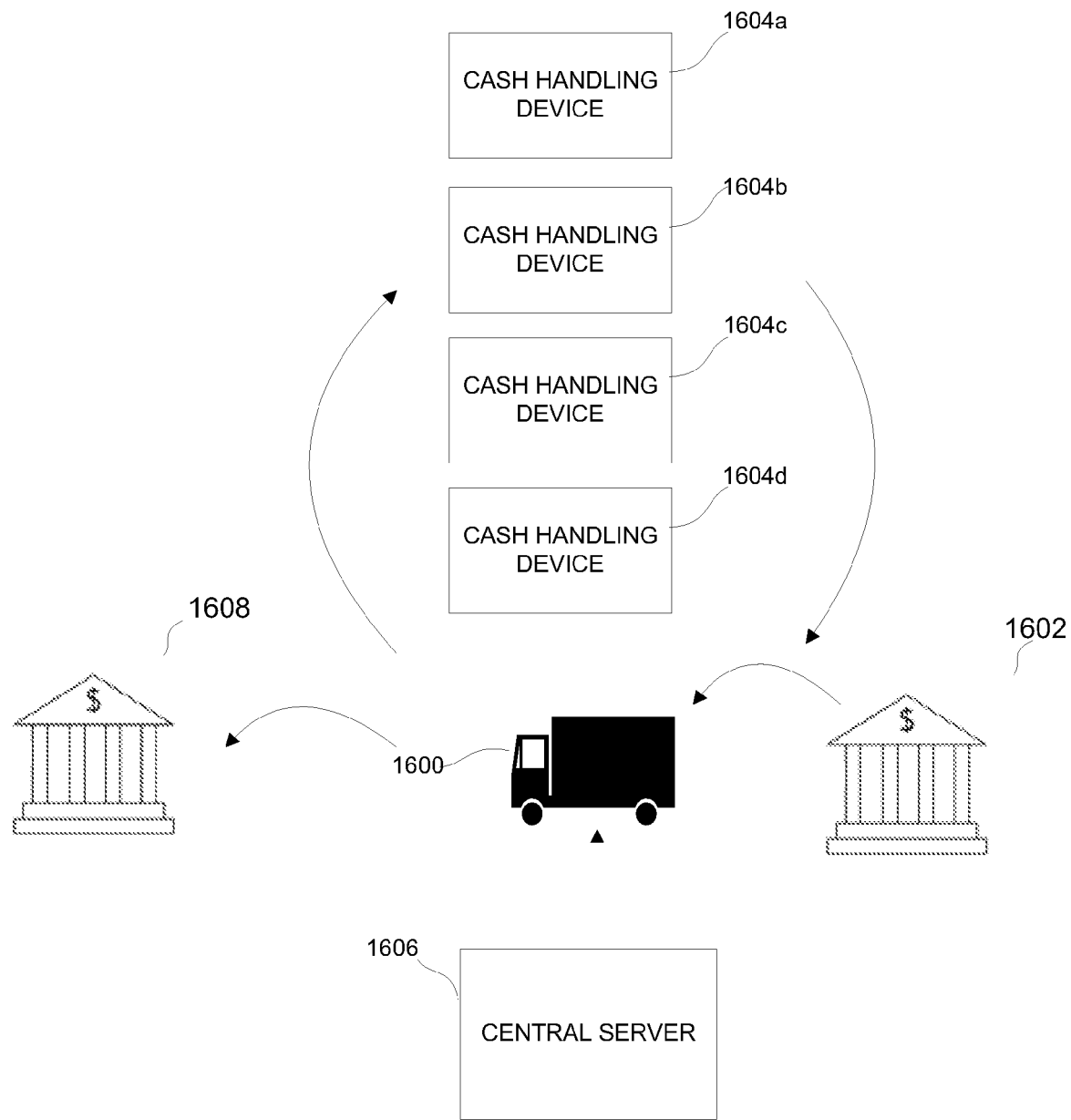
FIG. 16 is a simplified diagram of another cash transfer system in accordance with aspects described herein.

FIG. 16 illustrates another example system of this "cash on wheels" arrangement. The transport carrier may include any known means of transport and, in some arrangements, may be owned, managed, and the like by, the financial institution. As shown, a transport carrier 1600 includes a variety of funds, such as replenishment cartridges or other cash handling device storage modules, and the like that it may obtain from a financial institution 1602, for example, at the start of a transport route, or another centralized location or central processing center, such as location 1608. The transport carrier 1600 may obtain funds of various denominations, including paper currency and coin. Additionally or alternatively, the transport carrier 1600 may obtain empty cartridges or other storage modules that may be used to store funds picked up from a cash handling device or may be inserted into a cash handling device to replace a cartridge removed, i.e., a full overflow cartridge may be removed from a cash handling device and replaced with an empty cartridge.

The transport carrier 1600 may then leave the financial institution 1602 or other centralized location 1608 to begin a transport route. Throughout the route, the carrier 1600 may be in communication with both the financial institution 1602 and/or one or more cash handling devices 1004 intended for transactions. In some arrangements, a transport carrier may work within a specified geographic region and may have various nodes 1604a-1604d (such as cash handling devices, financial institution commercial customers, and the like) that it may service. For example, the transport carrier 1600 may be equipped to conduct transactions at cash handling devices, including cash recyclers, ATM's, depository machines, such as depository only machines, automated banking centers, and the like. In some arrangements, the nodes may be within the control of the financial institution 1602, such as a cash recycler located at client A, an ATM located at client B, a depository only machine at client C, and the like. In other arrangements, the nodes 1604a-1604d may be outside the control of the financial institution 1602, such as an ATM owned or managed by another financial institution. As a node 1604 is in need of replenishment or pick-up, the device 1604 may communicate that need directly to the transport carrier 1600 which will then route the carrier 1600 to the cash handling device 1604 to provide the desired replenishment or pick-up. In some arrangements, the request for change order may be communicated to a central server 1606 which will then forward the request to a truck 1600 that is determined to be carrying the desired replenishment denominations, amount, and the like. The central server may be located at the financial institution. In still other arrangements, the financial institution may initiate the request for transaction with the transport carrier.

The arrangement shown in FIG. 16 provides improved efficiency by transacting funds at various locations, types of devices, and the like and permitting those funds to be used to conduct transactions at other locations, types of devices, and the like. Along the steps of the transport route, as various devices/nodes/locations are services, the client account, including direct deposit account, financial institution general ledger accounts, commercial banking accounts, and the like, may be credited. In some cases, the credit may be immediate or almost immediate upon the funds being placed in the transport carrier.

Although the above examples indicate a central server and single carrier, the system may be used with a fleet of carriers in order to efficiently maintain the currency levels of a plurality of cash handling devices in multiple locations.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method of transferring cash between locations, comprising:
    determining, by a central server comprising a first processor and a first communication interface, a prescheduled route for a transport carrier vehicle conducting transport carrier transactions, the transport carrier vehicle being equipped with a transport carrier communication device having a second processor and a second communication interface;
    after determining the prescheduled route, receiving, by the central server, via the first communication interface, from a first cash handling device at a first location, a request from the first cash handling device for a transaction at the first location, the first location not being part of the prescheduled route;
    rerouting, by the central server, the transport carrier vehicle to the first location to complete the requested transaction at the first cash handling device at the first location using funds on board the transport carrier vehicle;
    receiving, by the central server, via the first communication interface, from the transport carrier communication device on the transport carrier vehicle, a transmission from the transport carrier communication device, the transmission from the transport carrier communication device comprising a denomination description of a portion of funds on board the transport carrier vehicle used to complete the requested transaction at the first location; and
    transmitting, by the central server, via the first communication interface, to a financial institution server, information regarding the transaction at the first location, wherein the information regarding the transaction at the first location comprises instructions for the financial institution server to credit or debit an account associated with the first location by an amount corresponding to the portion of the funds on board the transport carrier vehicle used to complete the requested transaction at the first location.

2. The method of claim 1, wherein transmitting the information regarding the transaction at the first location comprises transmitting instructions for the financial institution server to debit or credit a client account at the financial institution.

3. The method of claim 1, wherein transmitting the information regarding the transaction at the first location comprises transmitting instructions for the financial institution server to debit or credit an internal account.

4. The method of claim 1, wherein the request from the first cash handling device for the transaction at the first location is an on-demand request.

5. The method of claim 1, wherein the request from the first cash handling device for the transaction at the first location is an emergency request.

6. A method of transferring cash between locations, comprising:
    transmitting, by a central server comprising a first processor and a first communication interface, from the central server to a first transport carrier vehicle, a prescheduled route, the prescheduled route including a plurality of locations for the first transport carrier vehicle to visit, the first transport carrier vehicle being equipped with a transport carrier communication device having a second processor and a second communication interface;
    after transmitting the prescheduled route, receiving, by the central server, via the first communication interface, from a first cash handling device at a first location, a request from the first cash handling device for a transaction at the first location, the first location not being on the prescheduled route, the request from the first cash handling device for the transaction at the first location comprising a denomination description of the transaction;
    determining, by the central server and based on one or more transmissions received by the central server via the first communication interface from the transport carrier communication device on the first transport carrier vehicle and the denomination description of the transaction, that the first transport carrier vehicle is equipped with funds having proper denomination to complete the transaction requested by the first cash handling device at the first location;
    rerouting, by the central server, the first transport carrier vehicle to the first location to complete the transaction requested by the first cash handling device at the first location;
    receiving, by the central server and via the first communication interface, from the transport carrier communication device on the first transport carrier vehicle, an indication that the first transport carrier vehicle has completed the transaction requested by the first cash handling device at the first location; and
    transmitting, by the central server, via the first communication interface, and to a financial institution server associated with the first location, instructions to credit or debit an account associated with the first location by an amount corresponding to funds exchanged to complete the transaction requested by the first cash handling device at the first location.

7. The method of claim 6, wherein the transaction requested by the first cash handling device is completed using funds on board the first transport carrier vehicle.

8. The method of claim 7, wherein the transaction requested by the first cash handling device is completed without obtaining additional funds from a financial institution.

9. The method of claim 7, wherein the transaction requested by the first cash handling device is completed without obtaining additional funds from a centralized location.

10. The method of claim 6, further comprising determining, by the central server, whether the first transport carrier vehicle should resume the prescheduled route upon completion of the transaction requested by the first cash handling device.

11. The method of claim 10, further comprising:
upon determining that the first transport carrier vehicle should resume the prescheduled route, transmitting, by the central server, via the first communication interface, to the transport carrier communication device on the first transport carrier vehicle, an indication to resume the prescheduled route.

12. The method of claim 10, further comprising:
upon determining that the first transport carrier vehicle should not resume the prescheduled route, rerouting, by the central server, the first transport carrier vehicle to a second location not on the prescheduled route.

\* \* \* \* \*